(12) United States Patent
Yasuhara et al.

(10) Patent No.: US 6,719,321 B2
(45) Date of Patent: Apr. 13, 2004

(54) OCCUPANT RESTRAINT SYSTEM

(75) Inventors: Fumitoshi Yasuhara, Wako (JP); Koji Ikeda, Wako (JP); Takeru Otsuka, Wako (JP); Naoki Kawajiri, Wako (JP); Kazuaki Miyamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/167,298

(22) Filed: Jun. 11, 2002

(65) Prior Publication Data

US 2003/0006591 A1 Jan. 9, 2003

(30) Foreign Application Priority Data

Jun. 11, 2001 (JP) ........................................ 2001-175065

(51) Int. Cl.$^7$ .............................................. B60R 21/22
(52) U.S. Cl. ................................................... 280/730.2
(58) Field of Search ........................ 280/730.2, 728.1, 280/728.2

(56) References Cited

U.S. PATENT DOCUMENTS

| | | | | |
|---|---|---|---|---|
| 5,639,115 A | * | 6/1997 | Kelley et al. ............. | 280/728.3 |
| 6,079,732 A | * | 6/2000 | Nakajima et al. ......... | 280/728.2 |
| 6,142,506 A | * | 11/2000 | Patel et al. .............. | 280/728.2 |
| 6,145,908 A | * | 11/2000 | Deb et al. ................. | 296/39.1 |
| 6,152,485 A | * | 11/2000 | Kato .......................... | 280/749 |
| 6,199,907 B1 | * | 3/2001 | Mugford et al. ............ | 280/751 |
| 6,293,581 B1 | * | 9/2001 | Saita et al. ............... | 280/730.2 |
| 6,296,269 B1 | * | 10/2001 | Nagai et al. .............. | 280/728.2 |
| 6,485,049 B1 | * | 11/2002 | Prottengeier et al. .... | 280/730.2 |
| 6,502,855 B1 | * | 1/2003 | Greiner et al. ........... | 280/730.2 |
| 6,565,116 B1 | * | 5/2003 | Tajima et al. ............ | 280/730.2 |

FOREIGN PATENT DOCUMENTS

| | | |
|---|---|---|
| JP | 11-235965 | 8/1999 |
| JP | 2000-033847 | 2/2000 |

* cited by examiner

*Primary Examiner*—Son T. Nguyen
(74) *Attorney, Agent, or Firm*—Carrier Blackman & Associates, P.C.; Joseph P. Carrier; William D. Blackman

(57) ABSTRACT

A vehicular occupant restraint system is provided with an airbag and an inflator. A front end of the folded airbag is housed within a front pillar garnish covering a side face on the occupant compartment side of a front pillar, and impact absorbing ribs are formed on the inner face of the front pillar garnish only in a section(s) that receives little deformation when the airbag is deployed. Since the front pillar garnish can be easily flexed when the air bag is deployed, there is neither inhibition to the smooth deployment of the airbag nor splitting and scattering of a part of the front pillar garnish. Moreover, since the impact absorbing ribs are formed on the front pillar garnish in the section(s) that receives little deformation, the impact of a secondary collision to an occupant can be absorbed effectively by the impact absorbing ribs.

3 Claims, 17 Drawing Sheets

OCCUPANT RESTRAINT SYSTEM

BACKGROUND OF THE INVENTION

1. Technical Field of the Invention

The present invention relates to an occupant restraint system in which an airbag is disposed in a folded state along an upper edge of a door opening of a vehicle body and the airbag is inflated by a gas generated by an inflator when the vehicle is involved in a collision so that it is deployed into a curtain shape along the inner face of a side of an occupant compartment.

2. Description of the Related Art

A conventional occupant restraint system is known in, for example, Japanese Patent Application Laid-open Nos. 2000-33847 and 11-235965. In this type of occupant restraint system, a front part of the airbag is housed in a folded state within a front pillar garnish covering a side face, on the occupant compartment side, of a front pillar, and the airbag is deployed within the occupant compartment by deforming a part of the front pillar garnish.

Formed on the inner face of the known front pillar garnish are a large number of impact absorbing ribs for absorbing the impact of a secondary collision to an occupant. Since the rigidity of the front pillar garnish against flexing is increased by the impact absorbing ribs, the front pillar garnish becomes resistant to the flexing when the airbag is deployed, and there is a possibility that smooth deployment of the airbag might be inhibited and a part of the front pillar garnish might split and scatter.

The present invention has been achieved in view of the above-mentioned circumstances, and it is an object of the present invention to allow an airbag housed within a front pillar garnish to be deployed smoothly while maintaining the impact absorbing effect of the front pillar garnish by the impact absorbing ribs.

SUMMARY OF THE INVENTION

In order to achieve the above-mentioned object, a first aspect of the present invention proposes an occupant restraint system for a vehicle that includes an airbag disposed in a folded state along an upper edge of a door opening of a vehicle body; an inflator that generates gas when the vehicle is involved in a collision to inflate the airbag so that it is deployed in a curtain shape along an inner face of a side of an occupant compartment; a part of the folded airbag is housed within a front pillar garnish covering a side face, on the occupant compartment side, of a front pillar such that the garnish is deformed when the airbag is deployed; and an impact absorbing rib is formed on an inner face of a section of the front pillar garnish that is little deformed by deployment of the airbag.

Preferably a plurality of the impact absorbing ribs are formed on the front pillar garnish, but only on section(s) of the garnish which are little deformed by the deployment of the airbag.

In accordance with the above-mentioned system arrangement, the airbag is housed in a folded state within the front pillar garnish covering the side face, on the occupant compartment side, of the front pillar, and deploys within the occupant compartment through an opening formed by deforming a part of the front pillar garnish. In this case, since none of the impact absorbing ribs are formed on a section of the front pillar garnish that is to be deformed, there is neither inhibition to the smooth deployment of the airbag by the impact absorbing ribs that would otherwise make the front pillar garnish resistant to flexing, nor splitting and scattering of a part of the front pillar garnish. Moreover, since the impact absorbing ribs are formed on the section(s) of the front pillar garnish that receives little deformation, the impact of a secondary collision to an occupant can be absorbed effectively by the impact absorbing ribs.

Modes for carrying out the present invention are explained below by reference to embodiments of the present invention shown in the attached drawings. The above-mentioned object, other objects, characteristics and advantages of the present invention will become apparent from the detailed description of the embodiments of the invention presented below in conjunction with the attached drawings.

BRIEF DESCRIPTION OF THE DRAWINGS

FIG. 1 is a perspective view showing an interior of the occupant compartment of an automobile.

FIG. 2 is a view corresponding to FIG. 1, showing a state in which an airbag of an occupant restraint system has been deployed.

FIG. 3 is an enlarged view of the occupant restraint system in which the airbag has been deployed.

FIG. 4 is an exploded perspective view of the occupant restraint system.

FIG. 5 is an enlarged cross section along line 5—5 in FIG. 1.

FIG. 6 is an enlarged cross section along line 6—6 in FIG. 1.

FIG. 7 is an enlarged cross section along line 7—7 in FIG. 1.

FIG. 8 is an enlarged cross section along line 8—8 in FIG. 1.

FIG. 9 is an enlarged cross section along line 9—9 in FIG. 3.

FIG. 10 is an enlarged cross section along line 10—10 in FIG. 5.

FIG. 11 is a view taken in a direction of arrow 11 in FIG. 4.

FIG. 12 is a view taken in a direction of arrow 12 in FIG. 7.

FIG. 13 is an enlarged view of the vicinity of a rear part of the deployed airbag.

FIG. 14 is a front view of an occupant seated in a front seat.

DESCRIPTION OF THE PREFERRED EMBODIMENTS

Figure 1:
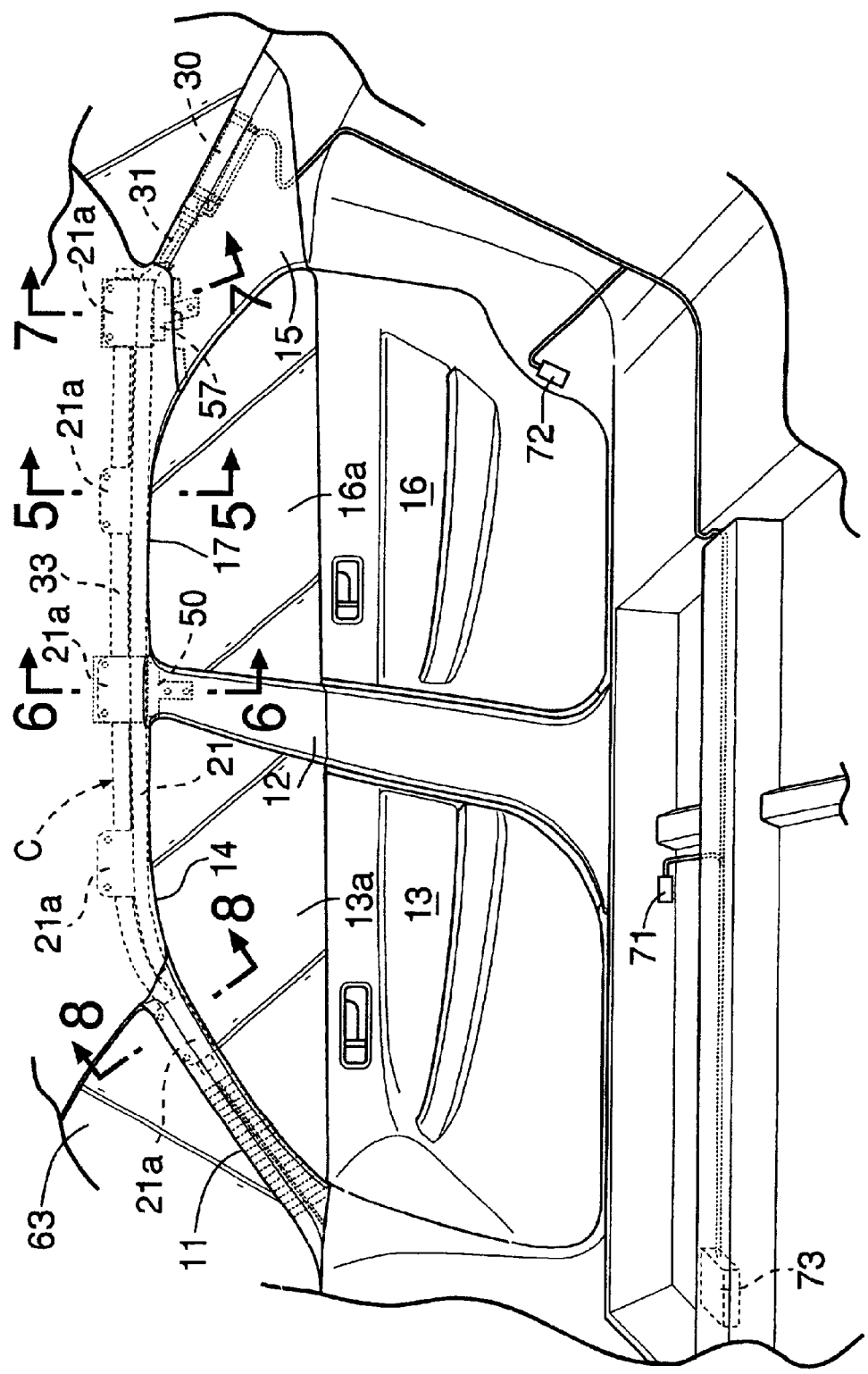
FIGS. 1 to 14 show a first embodiment of the present invention.

Referring to FIG. 1, a door opening 14 for receiving a front door 13 is formed between a front pillar 11 and a center pillar 12 on a vehicle body side face, and a door opening 17 for receiving a rear door 16 is formed between the center pillar 12 and a rear pillar 15. A roof side rail 18 (see FIG. 5)

extends in the longitudinal direction of the vehicle body so as to provide a connection between the upper end of the front pillar 11 and the upper end of the rear pillar 15, the roof side rail 18 defining the upper edges of the door openings 14 and 17 of the front door 13 and the rear door 16. An occupant restraint system C is provided along the roof side rail 18. The occupant restraint system C is provided on each of the left and right sides of the vehicle body. The occupant restraint systems C on the respective left and right sides of the vehicle have a substantially identical mirror-image structure. Therefore, a description of the structure on one side of the vehicle body will suffice to explain the invention, and that provided on the right side of the vehicle body is described below as representative thereof.

Figure 2:
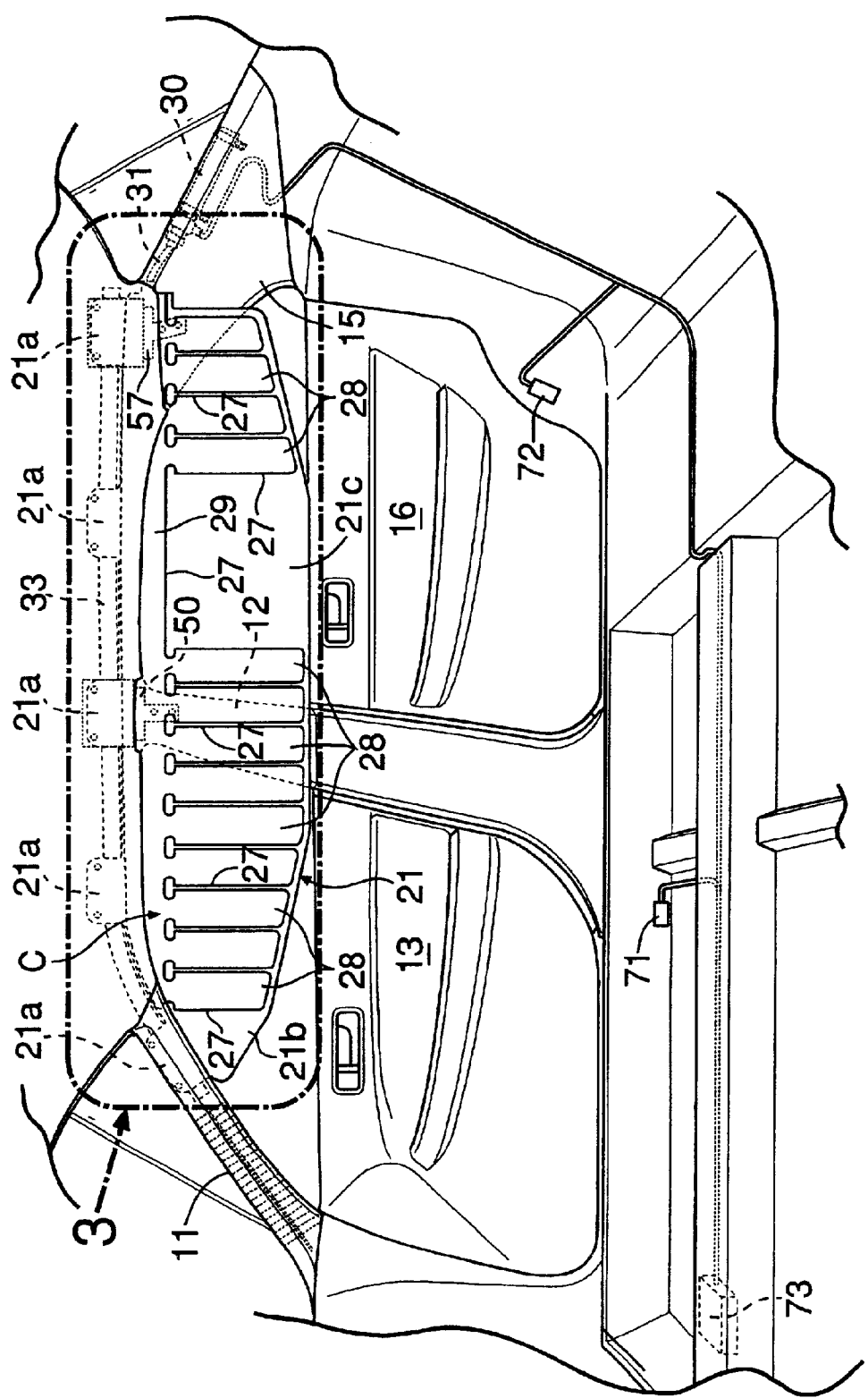

Referring to FIG. 2, when the vehicle is involved in a side collision or a rollover, if an acceleration equal to or greater than a predetermined value is detected, an airbag 21 of the occupant restraint system C is deployed downward into a curtain shape from the upper edges of the door openings 14 and 17 so as to block occupants seated in front and rear seats from impacting against the inner side face of the vehicle body, that is, the front pillar 11, the center pillar 12, the rear pillar 15, a window pane 13a of the front door 13, and a window pane 16a of the rear door 16.

Figure 3:
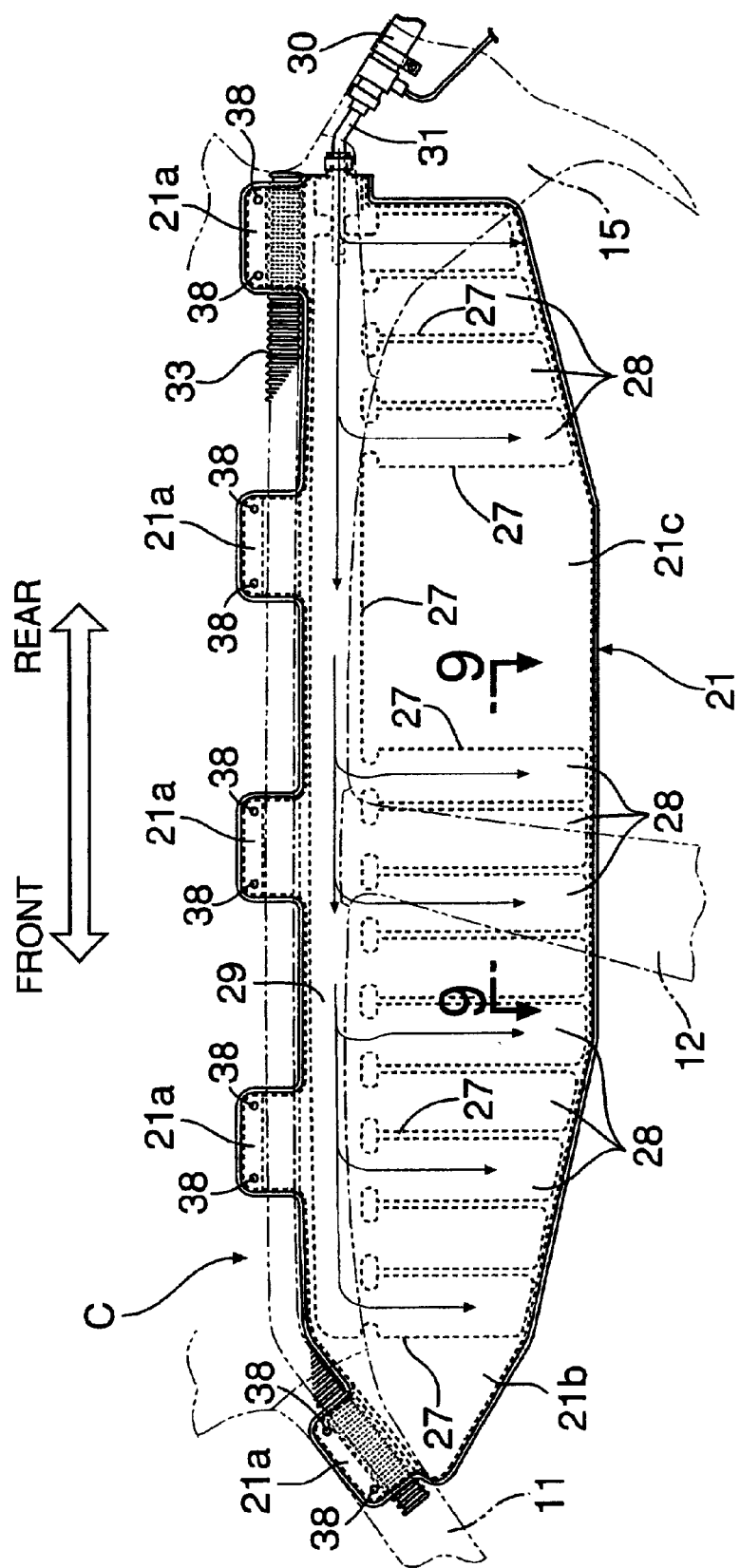
Figure 9:
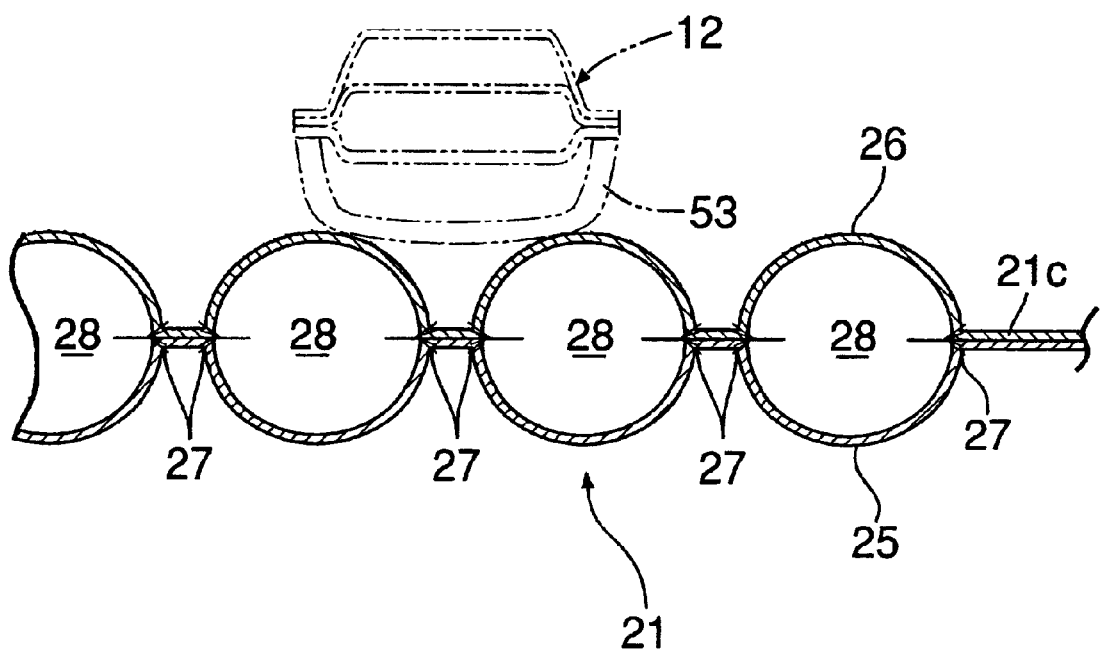

As shown in FIG. 3, the airbag 21 extending in the longitudinal direction of the vehicle body is formed by sewing with stitching 27 a first base fabric 25 and a second base fabric 26 superimposed one on top of the other, the two fabrics having substantially the same shape (see FIG. 9). The stitching 27 forms a plurality of (for example, thirteen) cells 28 and an upper communicating passage 29. The front end of a gas supply pipe 31 extending forward from an inflator 30 housed within the rear pillar 15 is inserted into the upper communicating passage 29. The lower ends of the thirteen cells 28 branching downward from the upper communicating passage 29 are closed. The portion of the gas supply pipe 31 which is inserted into the upper communicating passage 29, is tightened by means of a metal band 22 (see FIG. 13).

Positions of the airbag 21 that correspond to the rear side of the front pillar 11 and the rear side of the center pillar 12 are provided with non-inflatable sections 21b and 21c where no cells 28 are formed.

Figure 13:
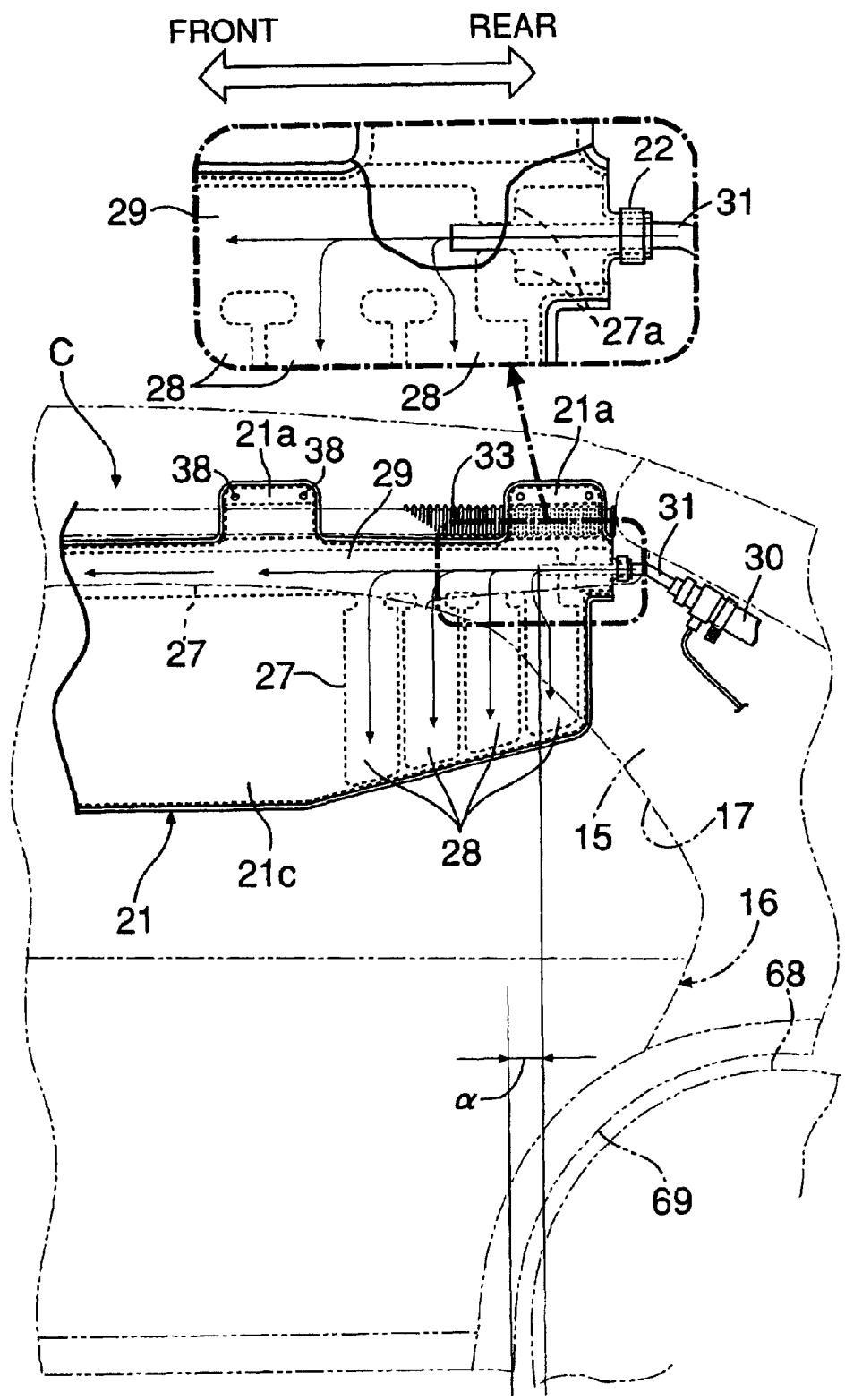

As shown in FIG. 13 in a magnified manner, since the diameter of the gas supply pipe 31 extending forward from the inflator 30 is smaller than the diameter of the upper communicating passage 29 of the airbag 21, the gas supply pipe 31 is positioned by means of pipe supports 27a formed from parts of the stitching 27 defining the upper communicating passage 29 so that the opening at the tip end of the gas supply pipe 31 is positioned at the center of the upper communicating passage 29. In this way, simply modifying parts of the stitching 27 of the airbag 21 can position the gas supply pipe 31 relative to the upper communicating passage 29, thus eliminating special parts for the positioning to contribute to a reduction in cost.

Figure 10:
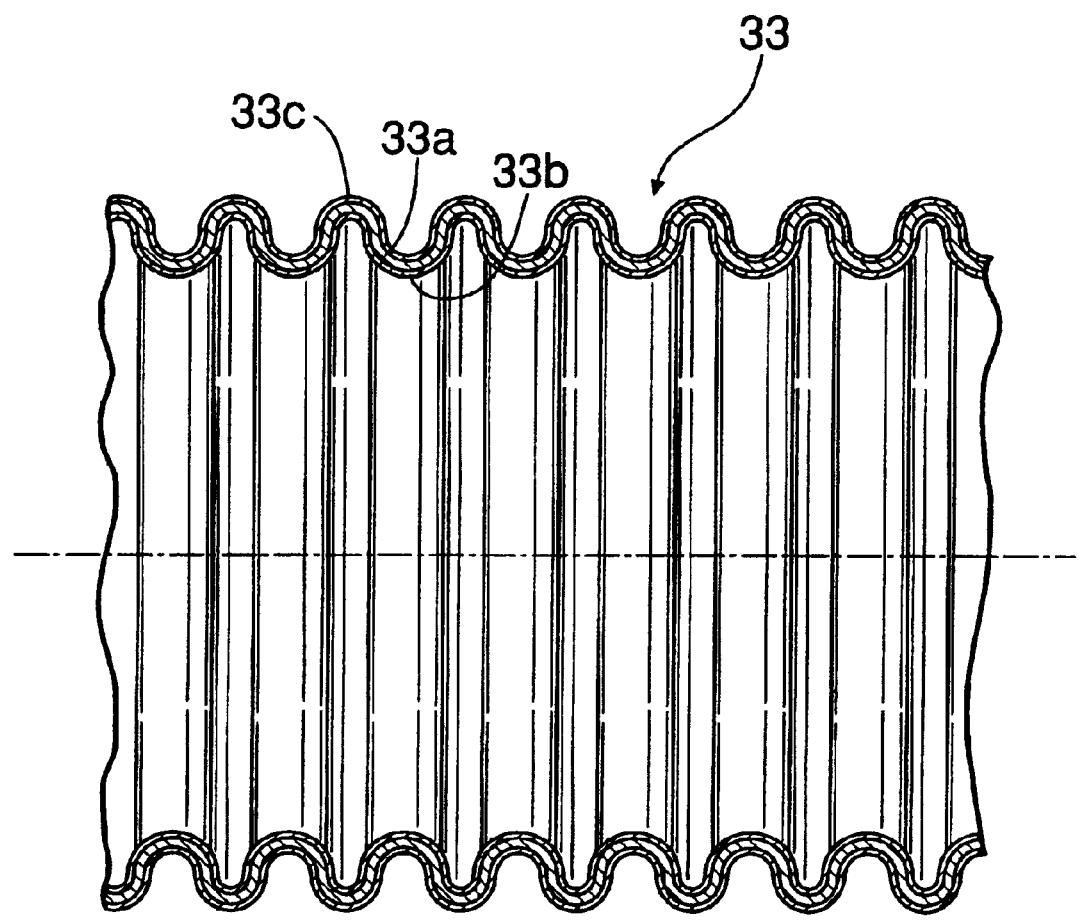

Provided along the upper edge of the airbag 21 are a plurality of (for example, five) impact absorbing member supports 21a. An impact absorbing member 33, which is a corrugated pipe, is integrated with the airbag 21 by means of the impact absorbing member supports 21a. As shown in FIG. 10, the impact absorbing member 33 is formed into a bellows having a circular cross section by laminating a main body 33a made of aluminum and inner and outer coverings 33b and 33c made of paper. The impact absorbing member 33 collapses by an external load to exhibit an effective impact-absorbing effect. A roof 34 is formed from an outer member 35, a center member 36, and an inner member 37. The upper ends of the four impact absorbing member supports 21a on the rear side of the airbag 21 are each fixed to the inner member 37 by means of two bolts 38 (see FIGS. 5 to 7). The front pillar 11 is formed from an outer member 39, a center member 40, and an inner member 41. The upper end of the impact absorbing member support 21a on the front end of the airbag 21 is fixed to the inner member 41 by means of two bolts 38 (see FIG. 8).

Since the folded airbag 21 and the impact absorbing member 33 are integrated in advance to form a module in this way, the mounting operation therefor becomes easy in comparison with a case where they are individually mounted in the vehicle body, thereby enhancing the operational efficiency and the precision of assembly. Moreover, since both the folded airbag 21 and the corrugated pipe impact absorbing member 33 are flexible, they can be placed easily along the curved roof side rail 18.

Figure 4:
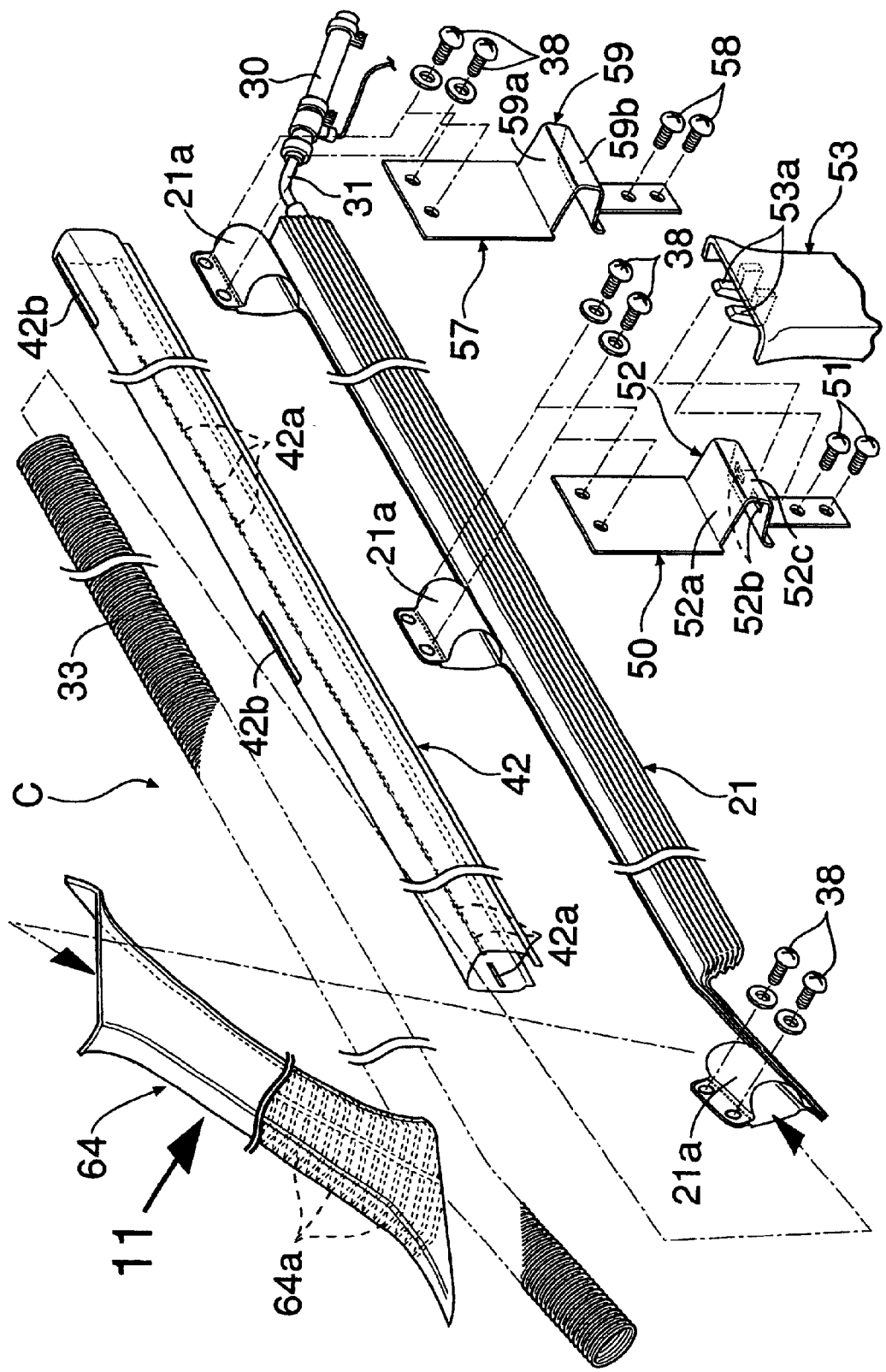

As is clear from FIG. 4, the folded airbag 21 is housed within an airbag cover 42 formed from a nonwoven fabric. The airbag cover 42 is made by sewing along the lower edges of a tube formed from a rectangular piece of cloth, and includes, on the side facing the roof side rail 18, perforation slits 42a that can be ruptured easily. The impact absorbing member supports 21a projecting from the upper end of the airbag 21, pass through openings 42b formed on the upper face of the airbag cover 42 and project upward.

Figure 5:
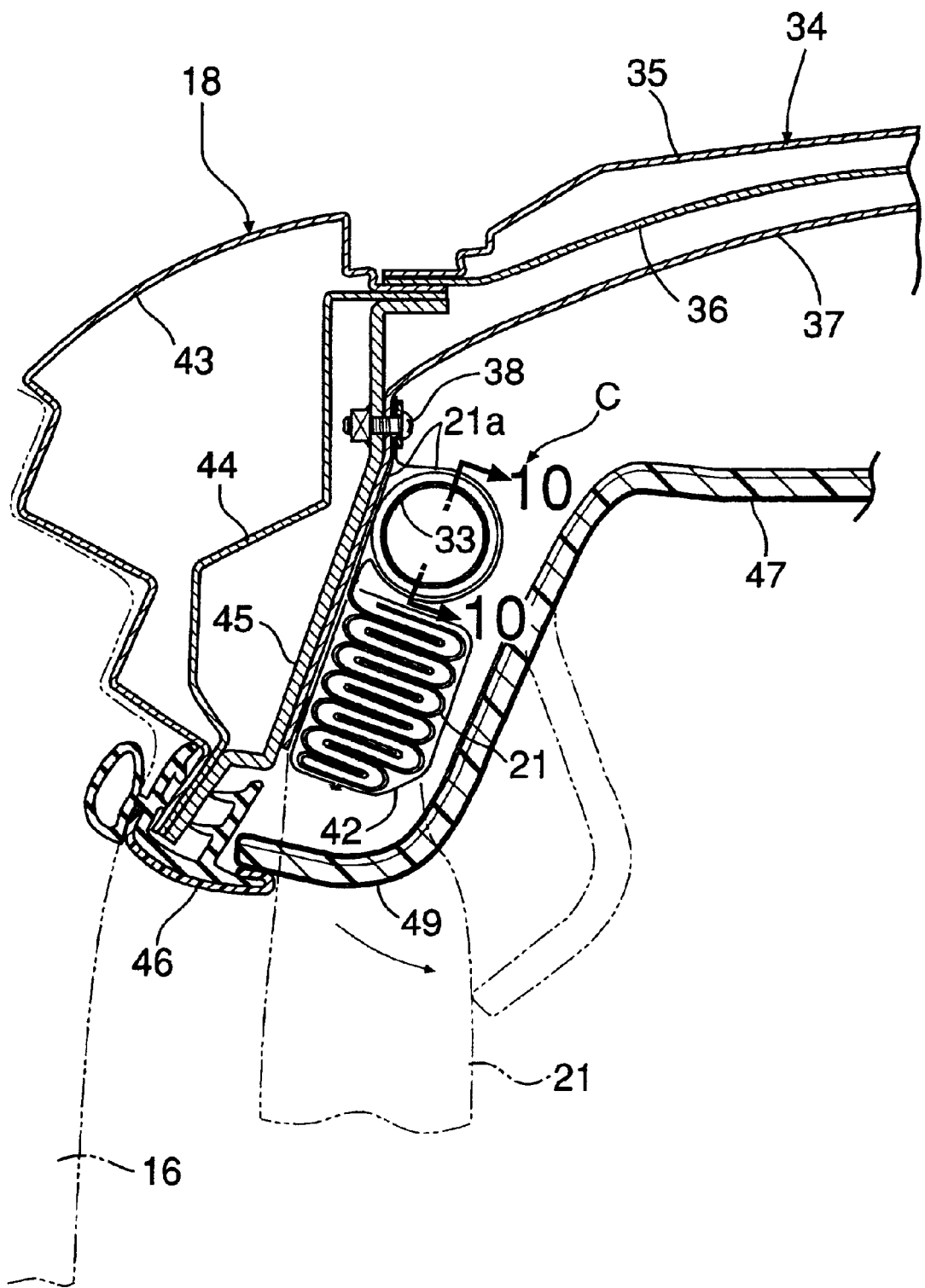

As is clear from FIG. 5, a weather strip 46 that can make contact with the rear door 16 (or the front door 13) is provided on the lower end of the roof side rail 18 formed from an outer member 43, a center member 44, and an inner member 45. The edge of a synthetic resin roof garnish 47 positioned along the lower face of the roof 34 latches on the edge of the weather strip 46 projecting from the lower end of the roof side rail 18 toward the occupant compartment. The occupant-compartment-facing lower face of the roof garnish 47 is covered with a skin material 49, and this skin material 49 is wrapped around the edge of the roof garnish 47 from the lower face side to the upper face side. It is possible thereby to prevent the edge of the synthetic resin roof garnish 47 from splitting and scattering when it is exposed to an impact.

Figure 6:
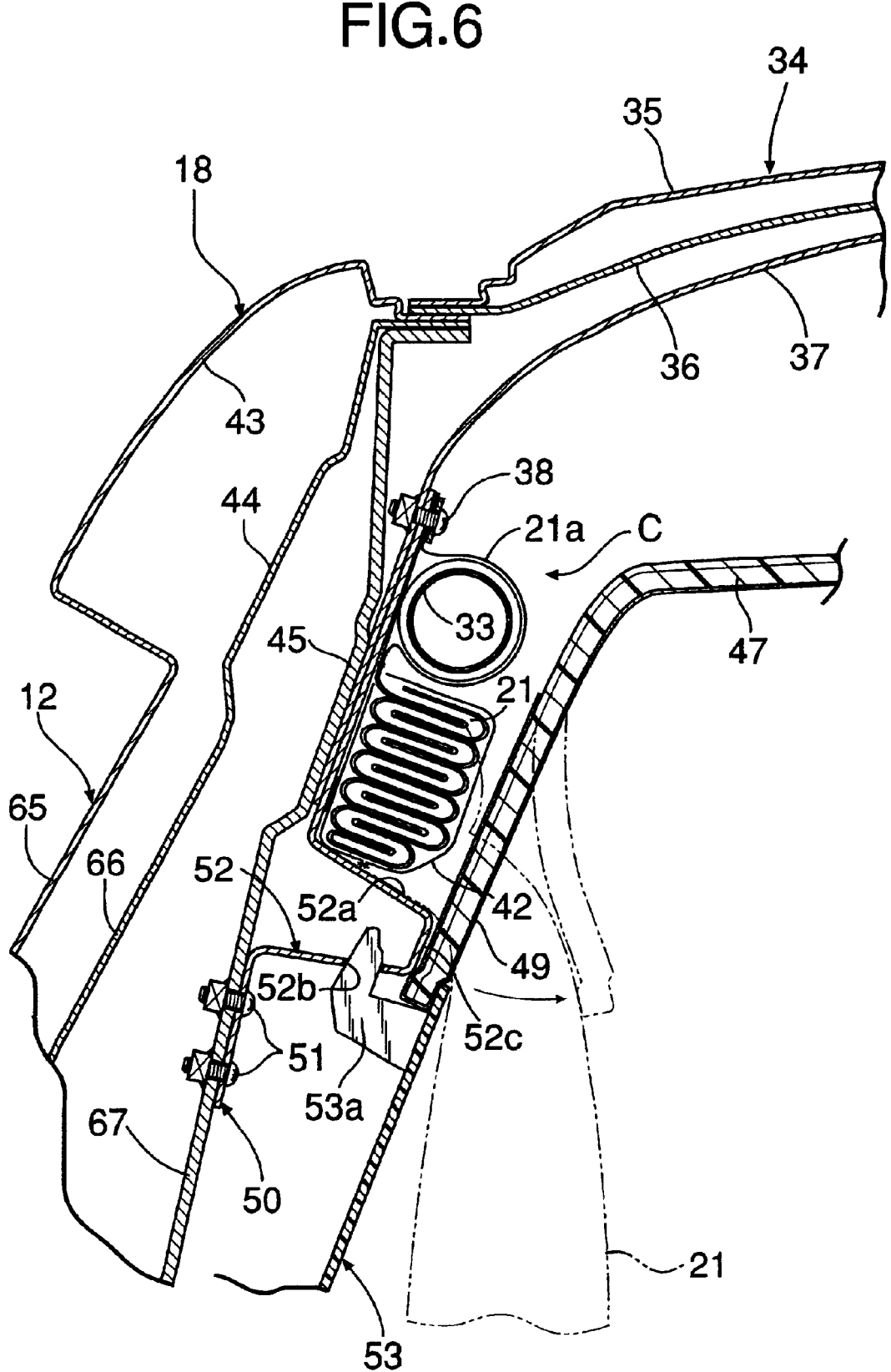

As is clear from FIGS. 4 and 6, the center pillar 12 extending downward from the roof side rail 18 is formed from an outside panel 65, a stiffener 66, and a center pillar inner portion 67. A front bracket 50 is mounted extending from the inner member 37 of the roof 34 to the center pillar inner portion 67 of the center pillar 12. The front bracket 50 is formed by bending a metal sheet; its upper part is superimposed on the impact absorbing member support 21a of the airbag, and fixed together to the inner member 37 of the roof 34 by means of two bolts 38, and its lower part is fixed to the center pillar inner portion 67 of the center pillar 12 by means of two bolts 51.

Formed in the middle section of the front bracket 50 is a projection 52 projecting toward the occupant compartment. A guide surface 52a formed on the upper face of the projection 52 faces the lower end of the folded airbag 21. Latches 53a projectingly provided on the inner face of an upper part of the center pillar garnish 53 engage with two latching holes 52b formed in the lower face of the projection 52. Formed on the inner face of the center pillar garnish 53 are a large number of impact absorbing ribs (not illustrated) in order to absorb the impact of a secondary collision to an occupant.

The upper part of the center pillar garnish 53 can thereby be fixed to the center pillar 12 without employing a special clip, etc. and, moreover, the center pillar garnish 53 can be fixed more securely in comparison with the case where a clip is employed. The lower edge of the roof garnish 47 is fixedly interposed between the top face 52c of the projection 52 of the front bracket 50 and the inner face at the upper end of the center pillar garnish 53.

Figure 7:
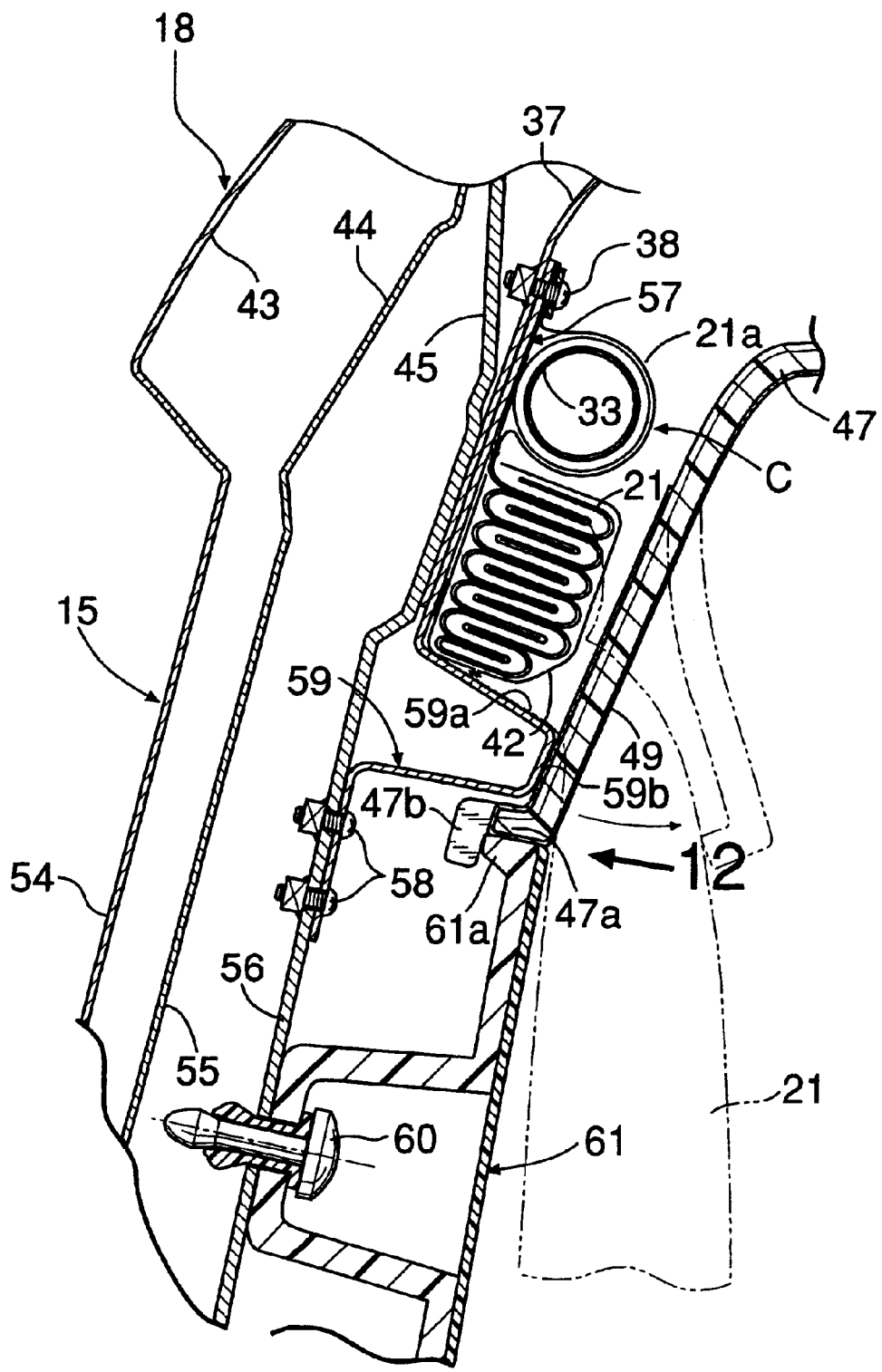
Figure 12:
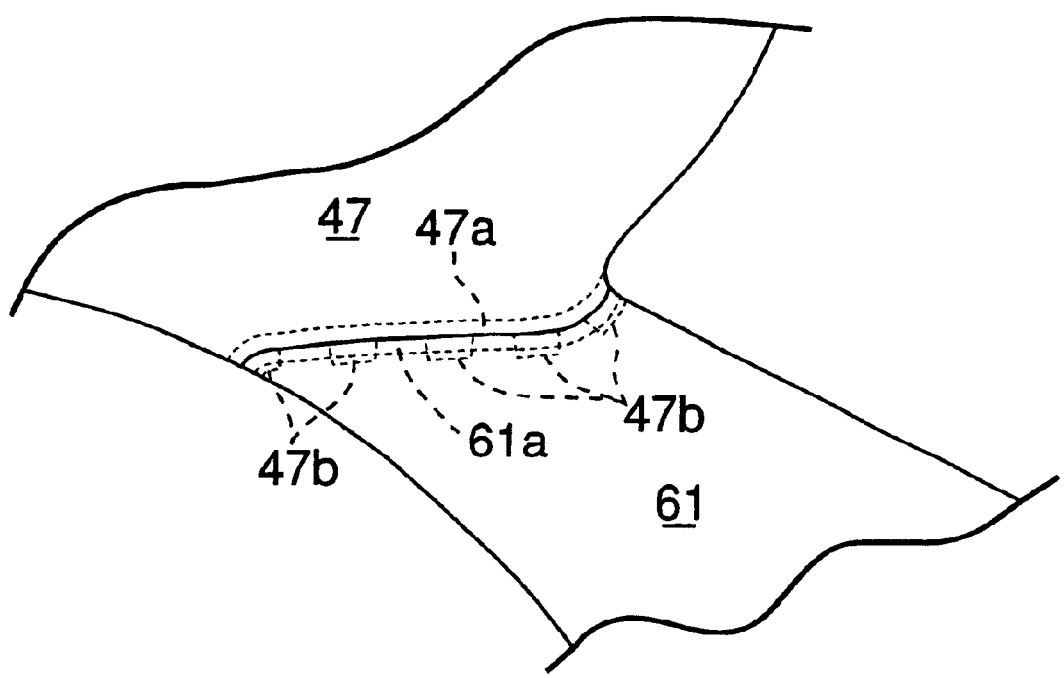

As is clear from FIGS. 4, 7 and 12, the rear pillar 15 extending downward from the roof side rail 18 is formed from an outer member 54, a center member 55, and an inner member 56. A rear bracket 57 is mounted extending from the inner member 37 of the roof 34 to the inner member 56 of the rear pillar 15. The rear bracket 57 has substantially the same shape as that of the front bracket 50; its upper part is superimposed on the impact absorbing member support 21a of the airbag 21, and fixed together to the inner member 37 of the roof 34 by means of two bolts 38, and its lower part is fixed to the inner member 56 of the rear pillar 15 by means of two bolts 58. Formed in the middle section of the rear bracket 57 is a projection 59 projecting toward the occupant compartment. A guide surface 59a formed on the upper face of the projection 59 faces the lower end of the folded airbag 21.

A rear pillar garnish 61 is fixed to the inner member 56 of the rear pillar 15 by means of a clip 60 and has on its upper end a flange 61a bending toward the outside of the vehicle body. Formed on the lower edge of the roof garnish 47 is a flange 47a that abuts against the flange 61a of the rear pillar garnish 61. The flange 47a of the roof garnish 47 has a plurality of (five in the embodiment) latches 47b projecting downward, and these latches 47b engage with the reverse face of the flange 61a of the rear pillar garnish 61. Formed on the inner face of the rear pillar garnish 61 are a large number of impact absorbing ribs (not illustrated) in order to absorb the impact of a secondary collision with an occupant.

Figure 8:
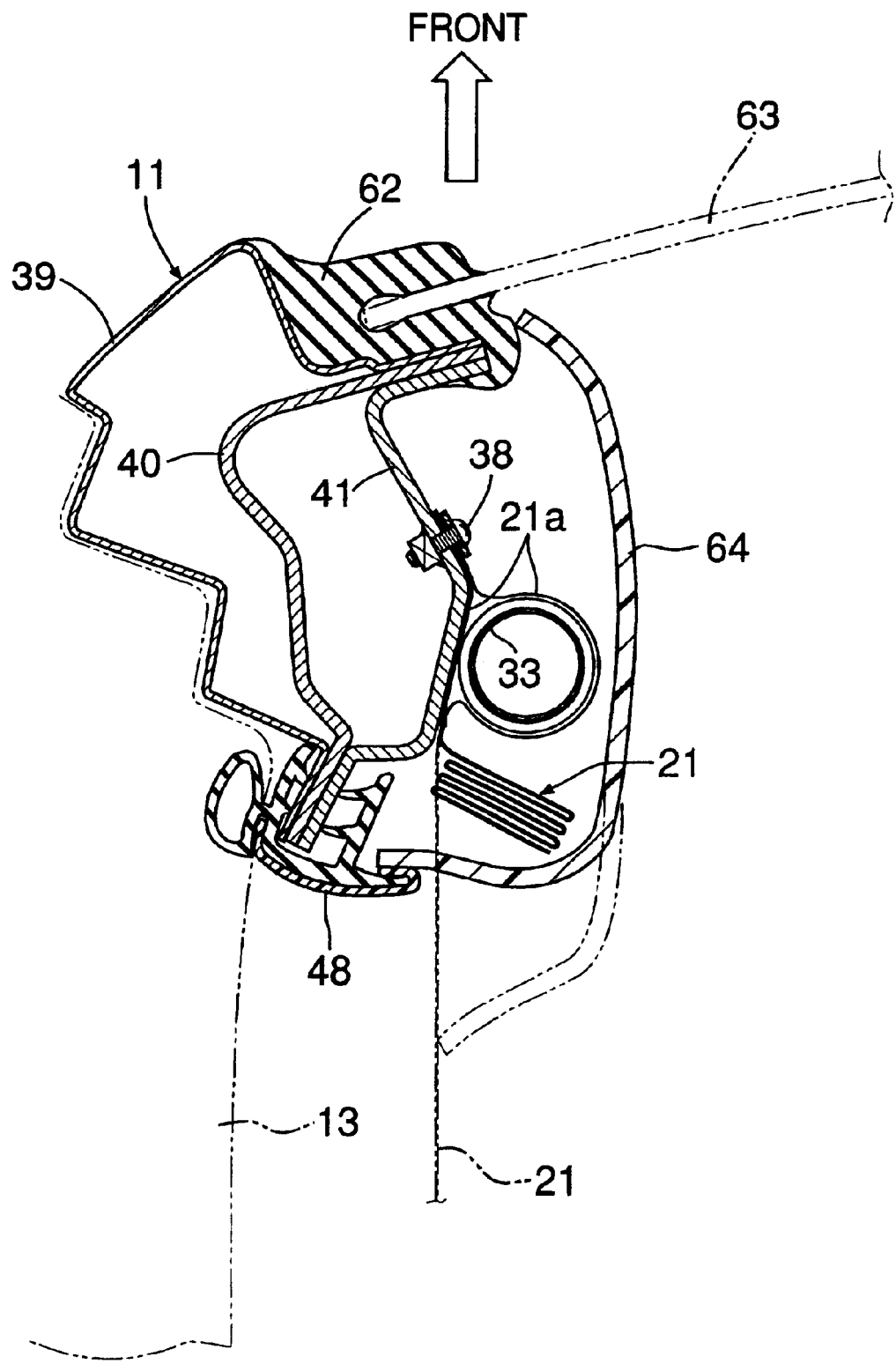
Figure 11:
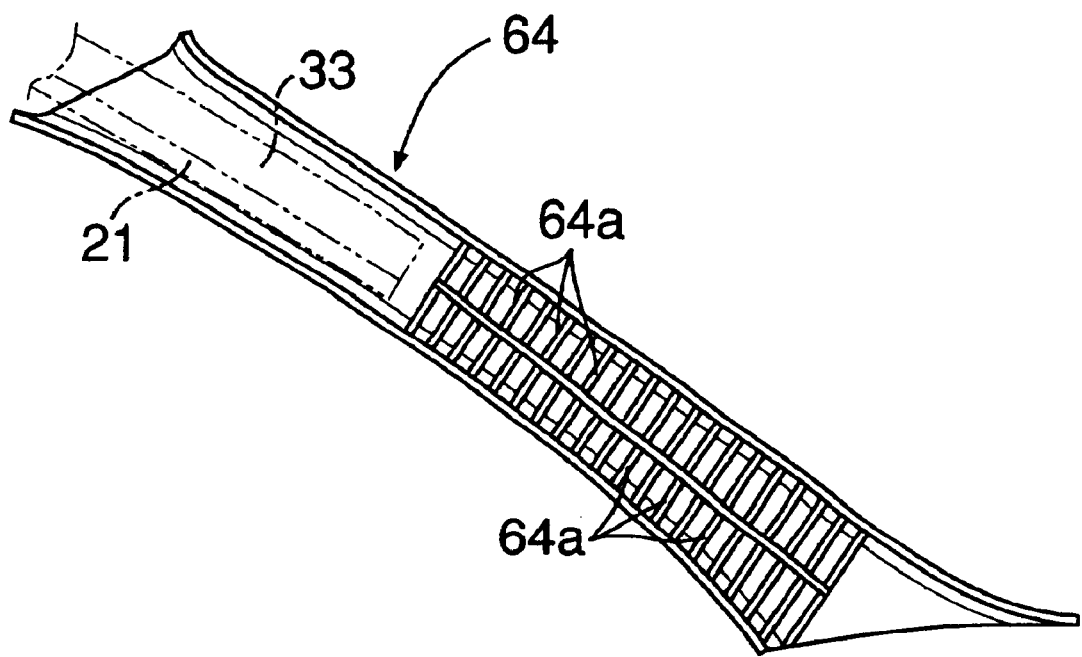

As shown in FIGS. 2, 8 and 11, a side edge of a windshield 63 is supported on the front face of the front pillar 11 via a rubber member 62. A front pillar garnish 64 having an arc-shaped curved cross section is mounted between the rubber member 62 and a weather strip 48 provided on the rear face of the front pillar 11. The upper half of the front pillar garnish 64 is hollow, and the folded non-inflatable part 21b on the front end of the airbag 21 and the front end part of the impact absorbing member 33 are housed therewithin. Integrally formed on the inner face of the lower half of the front pillar garnish 64, which houses neither the airbag 21 nor the impact absorbing member 33, are a large number of impact absorbing ribs 64a for absorbing an impact.

Housing the impact absorbing member 33 within the upper half of the front pillar garnish 64 and forming the large number of impact absorbing ribs 64a in the lower half of the front pillar garnish 64 in this way allows an impact absorbing effect to be exhibited over the whole length of the front pillar 11 while housing the front end part of the airbag 21 within the front pillar 11. Moreover, since no impact absorbing ribs 64a are formed in the upper half of the front pillar garnish 64 housing the front end part of the airbag 21, when the airbag 21 is deployed, the front pillar garnish 64 can be easily flexed, thus enabling the airbag 21 to be smoothly deployed and thereby reliably preventing a part of the front pillar garnish 64 from splitting and scattering.

As is clear from FIG. 13, the tip end of the gas supply pipe 31 extending within the upper communicating passage 29 of the airbag 21 is positioned in the rear of the front end of a wheelhouse 69 of a rear wheel 68 by a distance α. Normal deployment of the airbag 21 may be inhibited when the gas supply pipe 31 is damaged upon a side collision of the vehicle, but since the wheelhouse 69 of the rear wheel 68 is positioned in the vicinity of the wide rear pillar 15 and the tip end of the gas supply pipe 31 is positioned so as not to project beyond the front end of the wheelhouse 69 in order to increase the rigidity of the vehicle body against deformation, the damage to the gas supply pipe 31 can be minimized or effectively prevented upon a side collision. Moreover, since the inflator 30 is housed within the rear pillar 15 which is wider and more rigid than the front pillar 11, the effect of protecting the inflator 30 can also be enhanced.

As shown in FIG. 1, a front side-collision sensor 71 and a rear side-collision sensor 72 are connected to an electronic control unit 73, and when the electronic control unit 73 detects a vehicle side collision (or a vehicle rollover) based on signals from the two acceleration sensors 71 and 72, the electronic control unit 73 outputs an operation signal to the inflator 30 so as to deploy the airbag 21.

Figure 14:
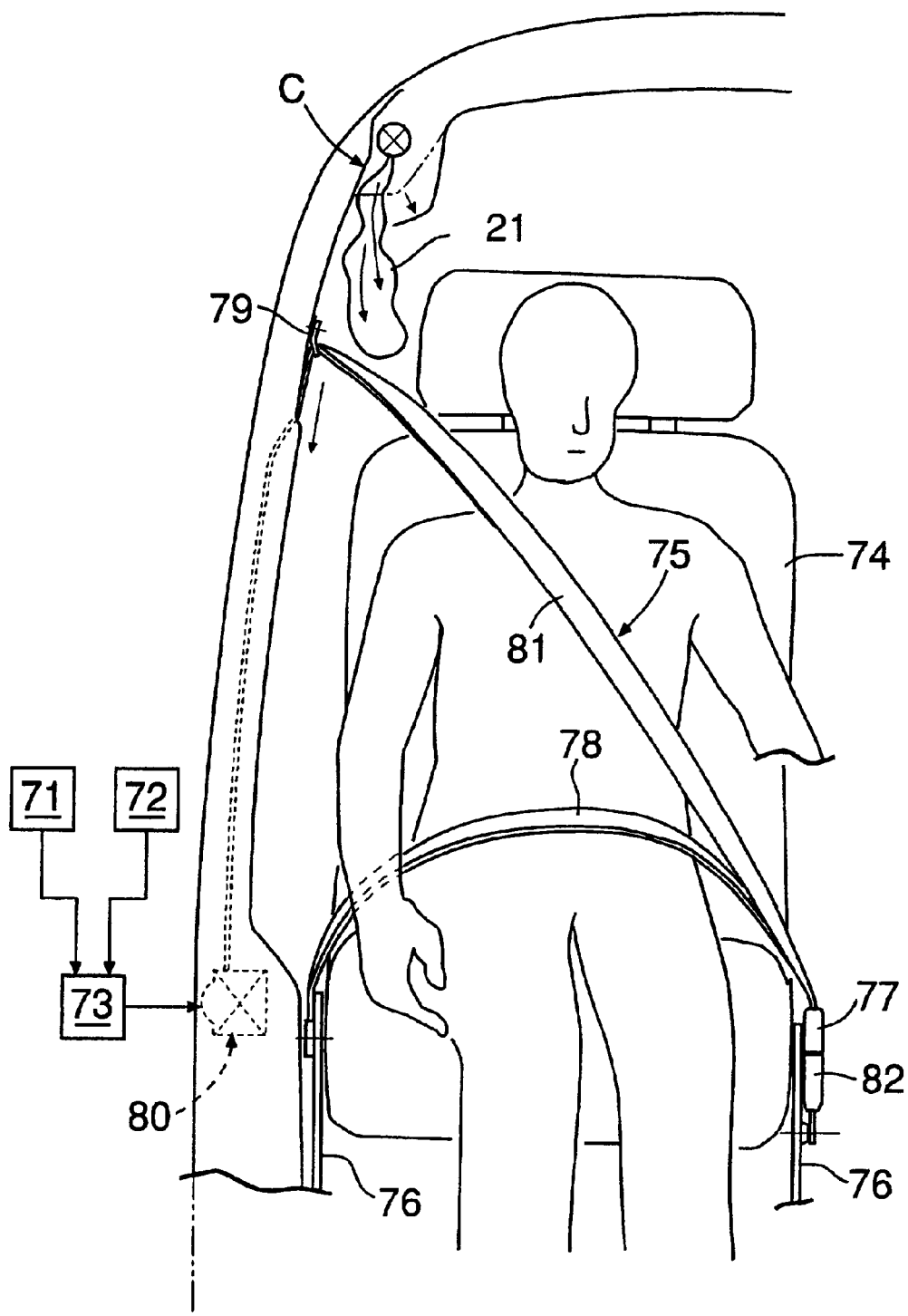

As shown in FIG. 14, a seat belt system 75 for restraining an occupant seated in a front seat 74 includes a lap belt 78 and a shoulder belt 81. One end of the lap belt 78 is fixed to a seat frame 76, and the other end thereof passes slidably through a slit formed in a tongue 77. One end of the shoulder belt 81 is integrally connected to said other end of the lap belt 78, and the other end of the shoulder belt 81 is wound up by a retractor 80 provided in a lower part of the center pillar 12, via a slit guide 79 provided on the center pillar 12. When the tongue 77 is pulled so as to couple it to a buckle 82 fixed to the seat frame 76 in a normal situation, the shoulder belt 81 can be freely drawn out from the retractor 80, but when a front collision sensor (not illustrated) detects a vehicle front collision, the retractor 80 equipped with a known pre-tensioner operates so as to draw in said other end of the shoulder belt 81, thereby reliably restraining the occupant in the front seat 74.

Next, the operation of the above-mentioned embodiment is explained.

When the front side-collision sensor 71 and the rear side-collision sensor 72 detect a vehicle side collision, the inflator 30 operates on an instruction from the electronic control unit 73, and the gas stored under pressure within the inflator 30 flows into the thirteen cells 28 via the gas supply pipe 31 and the upper communicating passage 29, thus inflating the thirteen cells 28. Inflating the airbag 21 ruptures the slits 42a of the airbag cover 42, and the airbag 21 whose restraint has been released deploys downward.

As shown in FIG. 5, in the door openings 14 and 17 of the front door 13 and the rear door 16, the lower edge of the roof garnish 47 is pressed downward due to the pressure of the deploying airbag 21, thus releasing the engagement with the weather strip 46 to form an opening therewith, and the airbag 21 deploys downward within the occupant compartment through the opening so formed.

As shown in FIG. 6, at the position of the center pillar 12, the lower edge of the roof garnish 47 is pressed downward due to the pressure of the deploying airbag 21, thus releasing the engagement with the upper end of the center pillar garnish 53 to form an opening therewith, and the airbag 21 deploys downward within the occupant compartment through the opening so formed.

Since the center pillar garnish 53 covering a side face, on the occupant compartment side, of the center pillar 12 is fixed to the front bracket 50 rather than to the center pillar 12, even when the upper part of the center pillar 12 is deformed relative to the roof side rail 18 because of a vehicle side collision, there is little change in the positional relationship between the center pillar garnish 53 and the airbag 21 supported in the upper part of the front bracket 50. This arrangement, together with secure fixing of the center pillar garnish 53 to the front bracket 50 by means of the latches 53a rather than by a clip, makes it difficult for the deploying airbag 21 to catch on the upper end of the center pillar garnish 53, thereby guaranteeing reliable deployment of the airbag 21.

Moreover, since the deploying airbag 21 is guided obliquely downward toward the occupant compartment along the tilted guide surface 52a of the projection 52 of the front bracket 50, the airbag 21 can be deployed yet more smoothly while avoiding any interference with the center pillar garnish 53.

As shown in FIG. 7, at the position of the rear pillar 15, the lower edge of the roof garnish 47 is pressed downward due to the pressure of the deploying airbag 21, thus releasing the engagement with the upper end of the rear pillar garnish 61 to form an opening therewith, and the airbag 21 deploys downward within the occupant compartment through the opening so formed. In this process, the deploying airbag 21 is guided obliquely downward toward the occupant compartment along the tilted guide surface 59a of the projection 59 of the rear bracket 57. Therefore, the airbag 21 can be deployed smoothly while avoiding any interference with the rear pillar garnish 61.

Furthermore, since the position of the vicinity of the lower edge of the roof garnish 47 is determined by clamping it from opposite sides between the top face 59b of the projection 59 and the flange 61a of the rear pillar garnish 61, the two flanges 47a and 61a abut against each other without forming any step, thereby improving the appearance. Moreover, since the latches 47b of the roof garnish 47 flex and easily disengage from the flange 61a of the rear pillar garnish 61 when the airbag 21 is being deployed, it is possible to reliably form an opening between the roof garnish 47 and the rear pillar garnish 61, through which the airbag 21 is deployed. If the entire lower edge of the roof garnish 47 were engaged with the reverse face of the upper edge of the rear pillar garnish 61, it would become difficult to smoothly separate the lower edge of the roof garnish 47 from the upper edge of the rear pillar garnish 61 when the airbag 21 deploys.

As shown in FIG. 8, at the position of the front pillar 11, the rear edge of the front pillar garnish 64 is pressed downward due to the pressure of the deploying airbag 21, thus releasing the engagement with the weather strip 48 to form an opening therewith, and the airbag 21 deploys downward within the occupant compartment through the opening so formed.

When the acceleration caused by a side collision is equal to or less than a predetermined value, the occupant restraint system C does not operate, but when the impact causes a secondary collision between an occupant and the lower edge of the roof garnish 47 facing the roof side rail 18 or an upper part of the front pillar garnish 64, not only does the corrugated pipe impact absorbing member 33 collapse, thus absorbing the impact, but also the folded airbag 21 exhibits a function of enhancing the impact absorbing effect. In this case, since the impact absorbing member 33 is supported being in contact with the inner member 37 of the roof 34 and the inner member 41 of the front pillar 11 (see FIGS. 5 to 8), the impact absorbing member 33 reliably collapses by pressure from these inner members 37 and 41, thereby effectively absorbing the impact of the secondary collision.

The pre-tensioner of the retractor 80 connected to the electronic control unit 73 operates not only when there is a vehicle front collision but also when a vehicle side collision is detected by the front side-collision sensor 71 and the rear side-collision sensor 72. Accordingly, prior to the deploying of the airbag 21 upon a vehicle side collision, the pre-tensioner applies a tension to the lap belt 78 and the shoulder belt 81 of the seat belt system 75 so that they interfere with the airbag 21 deploying downward, thereby reliably preventing the shoulder belt 81 from being displaced from the shoulder of the occupant.

Next, a second embodiment of the present invention is described with reference to FIGS. 15A and 15B.

Figure 15A:
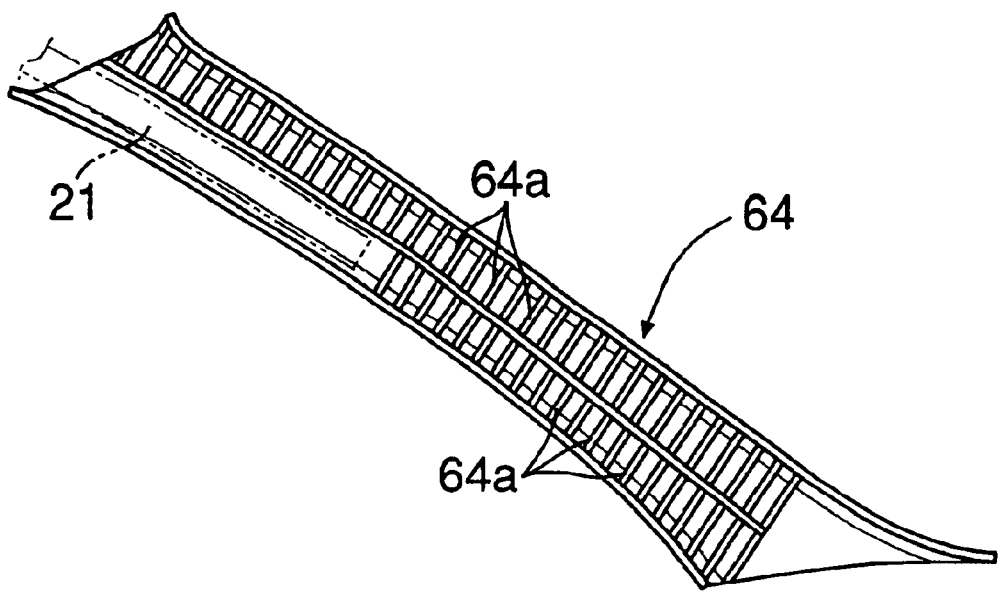
FIGS. 15A and 15B are diagrams, corresponding to FIG. 11, of a front pillar garnish according to a second embodiment of the present invention.

In the embodiment shown in FIG. 15(a), impact absorbing ribs 64a are formed in only a lower part and in the front side of an upper part of a front pillar garnish 64. A front part of the airbag 21 is housed in a folded state within the rear side of the upper part of the garnish where no impact absorbing ribs 64a are formed. Since the impact absorbing ribs 64a are formed on the front side of the upper part of the front pillar garnish 64, an impact absorbing member 33 such as shown in FIG. 10, which is a corrugated pipe, does not enter the interior of the front pillar 11 and terminates at the front end of the roof side rail 18.

Figure 15B:
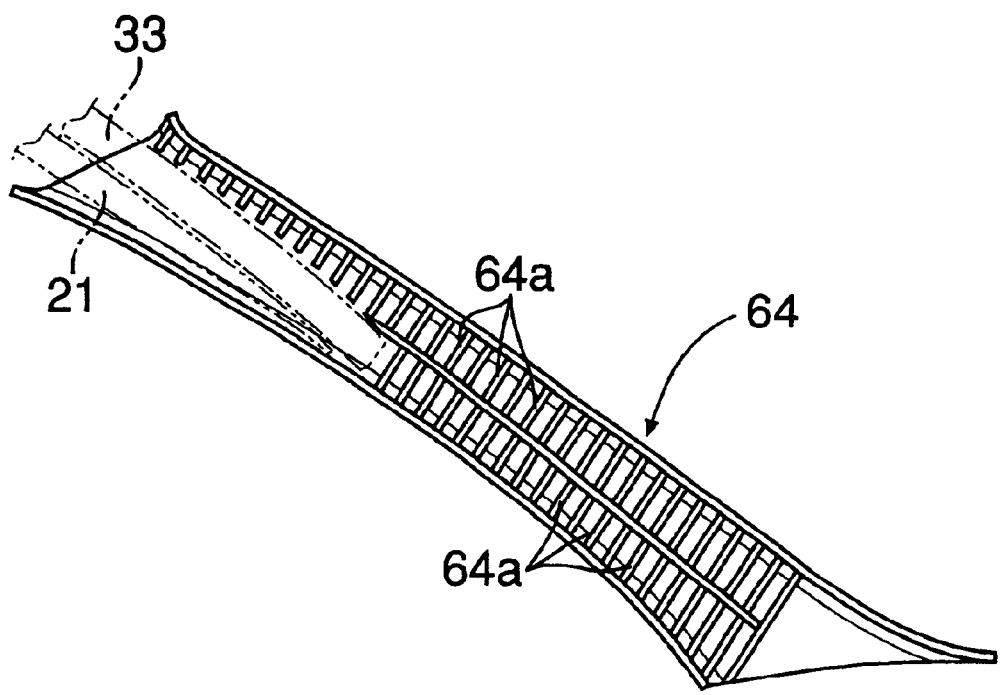

FIG. 15(b) is a modified version of the second embodiment, in which impact absorbing ribs 64a are formed only in a lower part and in the front side of an upper part of a front pillar garnish 64. The impact absorbing ribs 64a on the front side of the upper part gradually decrease in size toward the roof side rail 18 side. Accordingly, it is possible to house the impact absorbing member 33, which is a corrugated pipe, and a front part of the airbag 21 within the rear side of the upper part, where no impact absorbing ribs 64a are formed, without creating wasted space.

Figure 16:
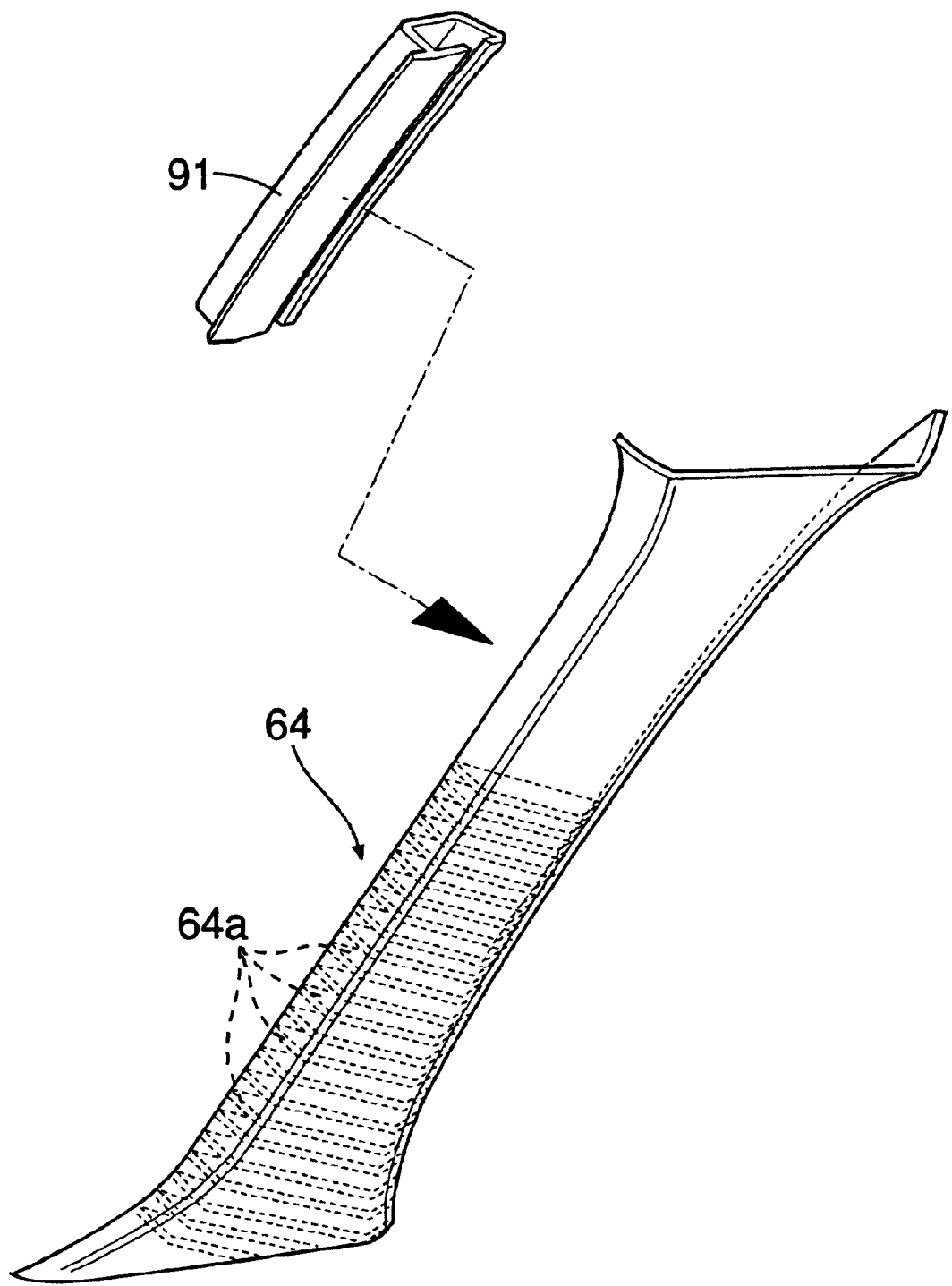
FIG. 16 is a diagram showing the structure of a front pillar garnish according to a third embodiment of the present invention.
Figure 17A:
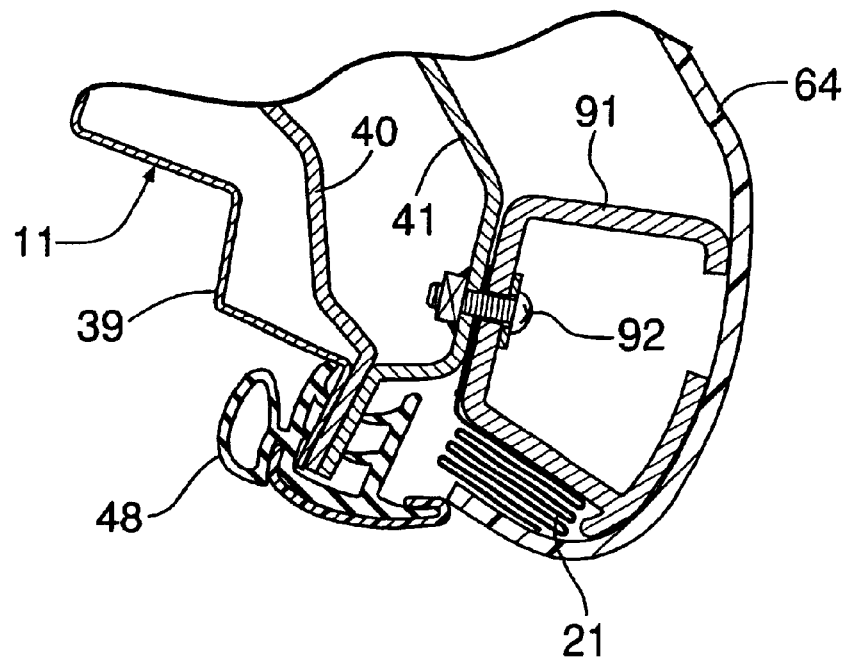
FIGS. 17A and 17B are diagrams, corresponding to FIG. 8, of the third embodiment of the present invention.
Figure 17B:
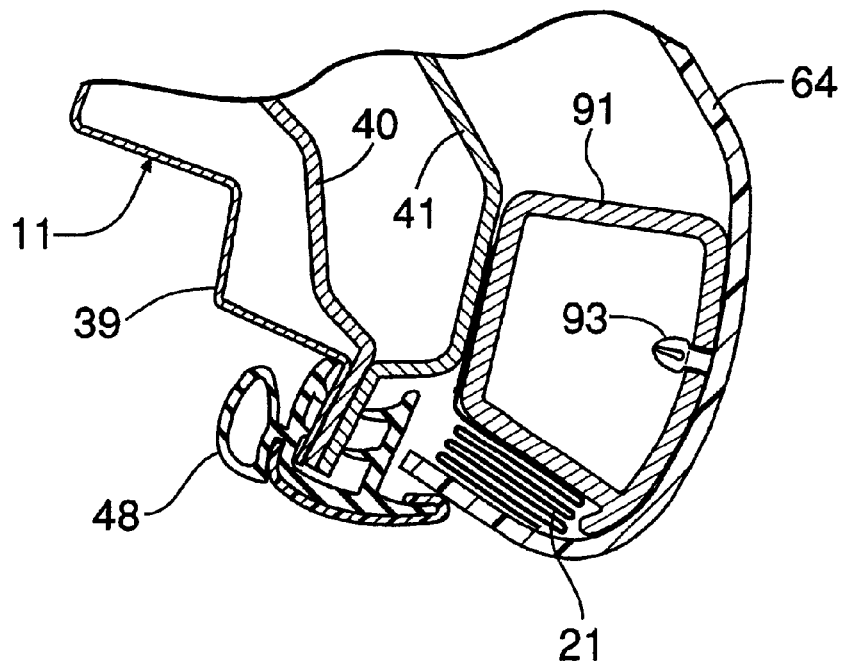

Next, a third embodiment of the present invention is described with reference to FIGS. 16, 17A and 17B.

In the third embodiment, impact absorbing ribs 64a are formed only in a lower part of a front pillar garnish 64. Housed in the front side of an upper part of the garnish 64 is an impact absorbing member 91 which is formed from drawn aluminum. Housed in the rear side of the upper part is a front part of the airbag 21 in a folded state. The impact absorbing member 91 may, for example, be either fixed to an inner member 41 of a front pillar 11 by means of bolts 92 or another fastener (see FIG. 17A) or fixed by means of clips 93 or another fastener projectingly provided on the inner face of the front pillar garnish 64 (see FIG. 17B).

The above-mentioned second and third embodiments can achieve the same functional effects as those of the first embodiment.

In accordance with the present invention described above, the airbag is housed in a folded state within the front pillar garnish covering the side face, on the occupant compartment side, of the front pillar, and deploys within the occupant compartment through an opening formed by deforming a part of the front pillar garnish. In this case, since no impact absorbing ribs are formed on the front pillar garnish in the section that is to be deformed, there is neither inhibition to the smooth deployment of the airbag by impact absorbing ribs that would otherwise make the front pillar garnish resistant to flexing nor splitting and scattering of a part of the front pillar garnish. Moreover, since impact absorbing ribs are formed on the front pillar garnish in the section that receives little deformation, the impact of a secondary collision to an occupant can be absorbed effectively by the impact absorbing ribs.

Although embodiments of the present invention are explained in detail above, the present invention can be modified in a variety of ways without departing from the spirit and scope of the present invention. In one way, the form of the impact absorbing ribs 64*a* of the front pillar garnish 64 is not limited to those of the disclosed embodiments, and can be modified by, for example, expanding the intervals therebetween. In another way, when the front pillar garnish 64 has no section that receives little deformation when the airbag 21 is deployed, impact absorbing ribs 64*a* may be eliminated completely.

We claim:

1. An occupant restraint system for a vehicle comprising:
   an airbag disposed in a folded state along an upper edge of a door opening of a vehicle body;
   an inflator that generates gas when the vehicle is involved in a collision to inflate the airbag so that it is deployed in a curtain shape along an inner face of a side of an occupant compartment;
   a part of the folded airbag being housed within a front pillar garnish covering a side face, on the occupant compartment side, of a front pillar such that the garnish is deformed when the airbag is deployed; and
   an impact absorbing rib being formed on an inner face of a section of the front pillar garnish that is little deformed by deployment of the airbag;
   wherein said section of the front pillar garnish on which said impact absorbing rib is formed does not house the airbag.

2. The occupant restraint system according to claim 1, wherein a plurality of said impact absorbing ribs are formed on said front pillar garnish, and said impact absorbing ribs are provided only on said section of the front pillar garnish that is little deformed by deployment of the airbag.

3. The occupant restraint system for a vehicle comprising:
   an airbag disposed in a folded state alone an upper edge of a door opening of a vehicle body;
   an inflator that generates gas when the vehicle is involved in a collision to inflate the airbag so that it is deployed in a curtain shape along an inner face of a side of an occupant compartment
   a part of the folded airbag being housed within a front pillar garnish covering a side face, on the occupant compartment side, of a front pillar such that the garnish is deformed when the airbag is deployed; and
   a plurality of impact absorbing rib being formed on an inner face of a section of the front pillar garnish that is little deformed by deployment of the airbag;
   wherein said impact absorbing ribs are provided only on a lower section of the front pillar garnish, and the part of said airbag is housed within an upper section of said front pillar garnish.

* * * * *

UNITED STATES PATENT AND TRADEMARK OFFICE
CERTIFICATE OF CORRECTION

| | | |
|---|---|---|
| PATENT NO. | : 6,719,321 B2 | Page 1 of 1 |
| APPLICATION NO. | : 10/167298 | |
| DATED | : April 13, 2004 | |
| INVENTOR(S) | : Yasuhara et al. | |

It is certified that error appears in the above-identified patent and that said Letters Patent is hereby corrected as shown below:

IN THE SPECIFICATION

Column 5, line 25, change "end a flange 61_a bending" to --end a flange 61a bending--.

IN THE CLAIMS

Column 10, claim 3, line 15, after "occupant compartment" insert a semicolon.

Signed and Sealed this

Seventeenth Day of July, 2007

JON W. DUDAS
*Director of the United States Patent and Trademark Office*